Dec. 3, 1929.  L. A. WOODARD  1,738,340
CONVEYER TABLE FOR CROSS ROLL MILLS
Filed Feb. 23, 1928   3 Sheets-Sheet 1
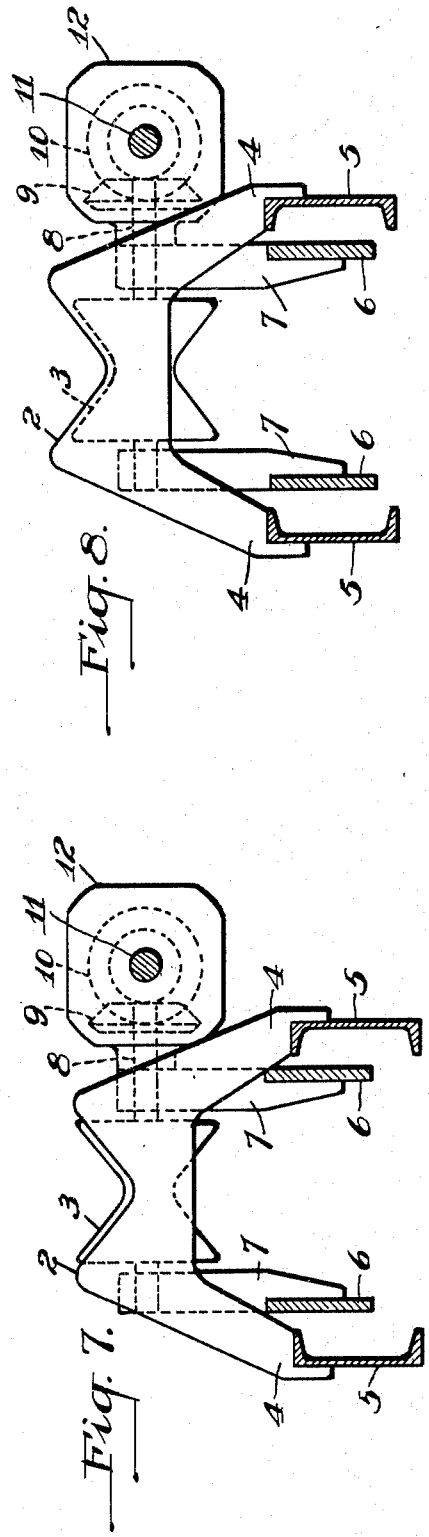
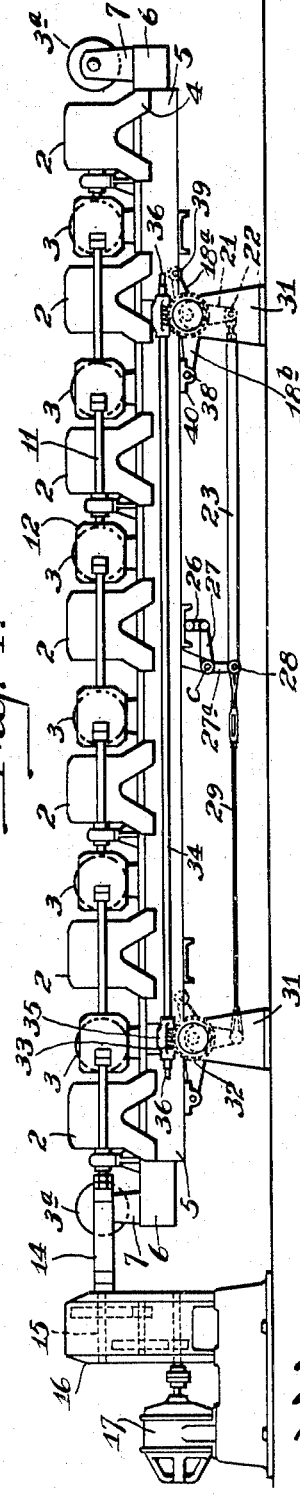
INVENTOR
Louis A. Woodard
by C. M. Clarke
atty Dec. 3, 1929.                       L. A. WOODARD                       1,738,340
                        CONVEYER TABLE FOR CROSS ROLL MILLS
                   Filed Feb. 23, 1928            3 Sheets-Sheet 2
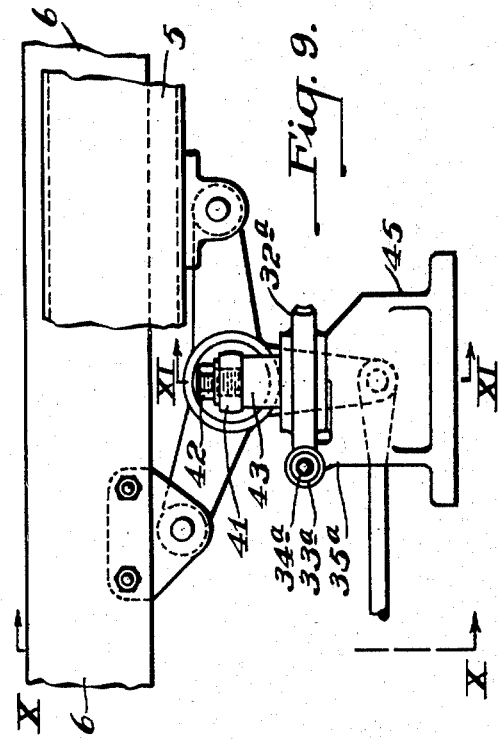
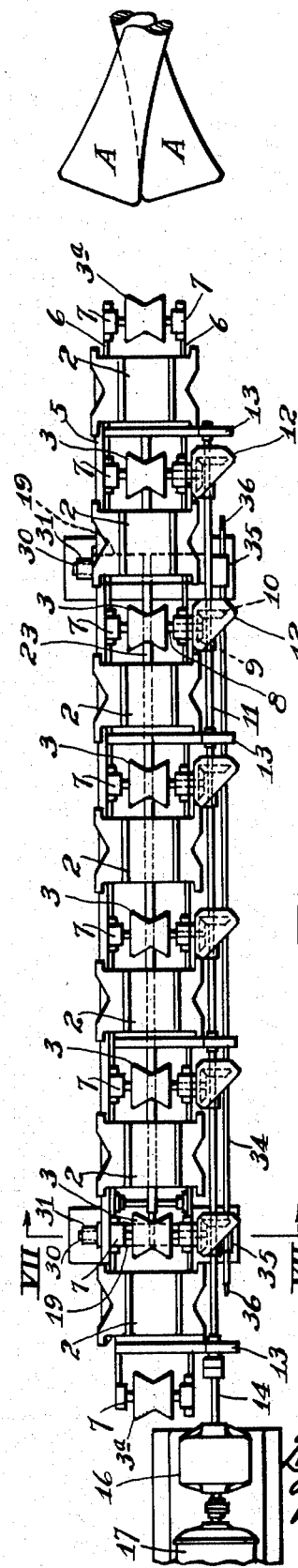
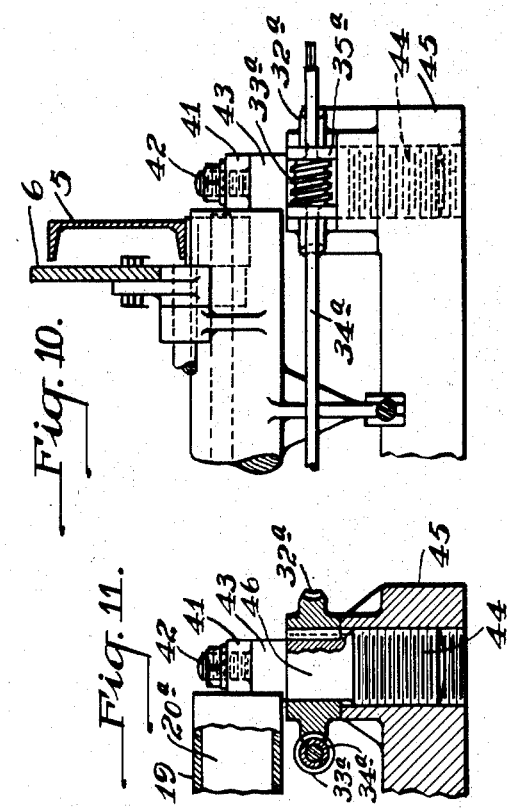
INVENTOR Dec. 3, 1929.  L. A. WOODARD  1,738,340
CONVEYER TABLE FOR CROSS ROLL MILLS
Filed Feb. 23, 1928  3 Sheets-Sheet 3

INVENTOR
Louis A. Woodard
by C. M. Clarke
atty.

Patented Dec. 3, 1929

1,738,340

UNITED STATES PATENT OFFICE

LOUIS A. WOODARD, OF ZANESVILLE, OHIO

CONVEYER TABLE FOR CROSS-ROLL MILLS

Application filed February 23, 1928. Serial No. 256,239.

My invention is an improvement in the art of manufacturing pipe or rods or other similar material and refers particularly to a feeding table for delivery of the article to be rolled, to or from the mill or reducing or finishing rolls.

In the manufacture of pipe, either butt weld, or lap weld, or seamless, or of round bars, they are commonly straightened, sized, and rounded, by being passed between cross rolls of suitable contour, with their axes inclined or crossed with relation to the axis of the pipe or bar being rolled.

For the purpose of avoiding distortion of the pipe or other unit, it is desirable that it should enter and be supported during its passage through the cross rolls with its axis coincident with its path through or between the rolls. As one of the cross rolls is usually fixed and the other adjustable, for different diameters of pipe, etc., it is desirable to provide means for compensating for such difference in the delivery table or conveyer, by providing for a corresponding adjustment as to height or elevation of the supporting and transferring means for the pipe being transferred.

Upon entering the cross rolls and being gripped thereby and rotated, the pipe itself will also rotate on its axis while it is being fed forward at a speed dependent upon the peripheral speed of the rolls and their inclination, entirely independent of the speed of travel maintained by the feeding means, as rollers, in carrying the pipe to the cross rolls. If the pipe or bar is not straight as is commonly the case, its rotation on its axis in passing between the cross rolls will ordinarily cause the free rear end to rotate more or less concentrically around such theoretical axial line.

Such rotation, in the manner of a whipping or lashing movement, is liable to cause damage by striking or pounding with considerable force against the feed rollers, tending to cause damage to them or their driving mechanisms or parts.

For the purpose of obviating such danger, it is desirable to effect retraction or movement of the feed rollers at or away from the line of travel and support, or beyond the range of such rotating free movement of the tube or pipe. For such purpose I provide, in the feed table of the present application, a series of vertically adjustable supporting platforms or apron plates each separated from the other and in the form of a supporting trough, with alternately located and alternately adjustable feeding rollers. Between the apron plates are a corresponding series of alternating feed rollers of the V or U type, all adapted to be elevated above the supporting surface of the apron plates for feeding the tubes to the mill as the apron plates are lowered, and vice versa. The invention provides means for lowering the rollers all together below the apron plates as the latter are raised and for rotating the several feed rollers when elevated to operative position.

The invention also utilizes and embodies means for vertically adjusting the supporting mechanism for the apron plates and feed rollers so as to raise and lower them all together, for adjustment or compensation upwardly or downwardly due to variation in diameter of the article being rolled.

Referring to the drawings:

Fig. 1 is a view in elevation of a feed table in position for delivery to the cross rolls of a reducing mill;

Fig. 2 is a plan view of Fig. 1;

Fig. 6 is a diagrammatic view showing the connections between the middle prime mover and the oppositely located alternating raising and lowering mechanisms for the tables;

Fig. 7 is a cross section through the table on the line VII—VII, of Fig. 2 showing the rollers elevated for feeding and the supporting apron depressed;

Fig. 8 is a similar view, showing the alternating position, with the feeding rollers depressed below the supporting aprons;

Fig. 9 is a detail view in side elevation, showing a modified level adjustment;

Fig. 10 is a partial section on the line X—X of Fig. 9;

Fig. 11 is a vertical section on the line XI—XI of Fig. 9.

Figure 3:
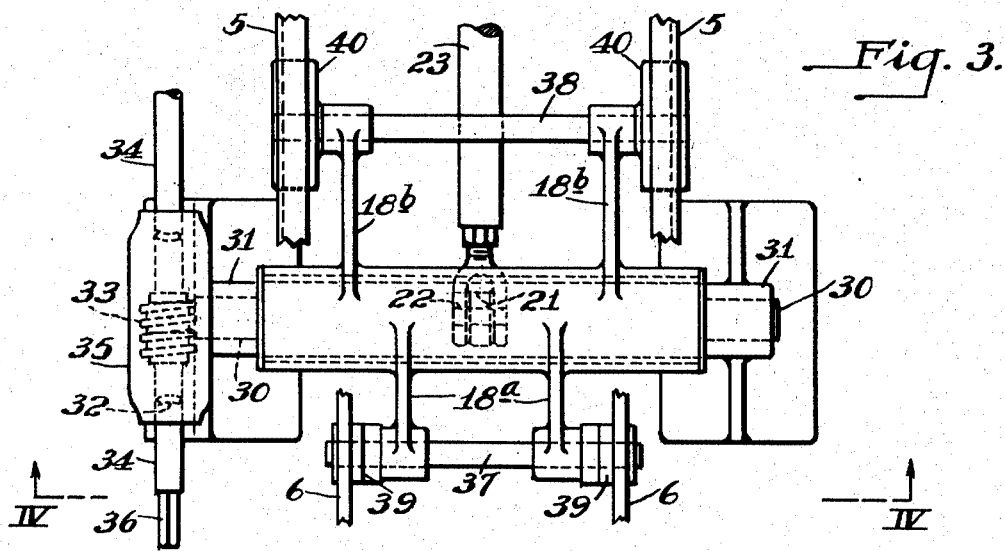
Fig. 3 is an enlarged plan view of the adjustable supporting means for the compound table mechanism.
Figure 4:
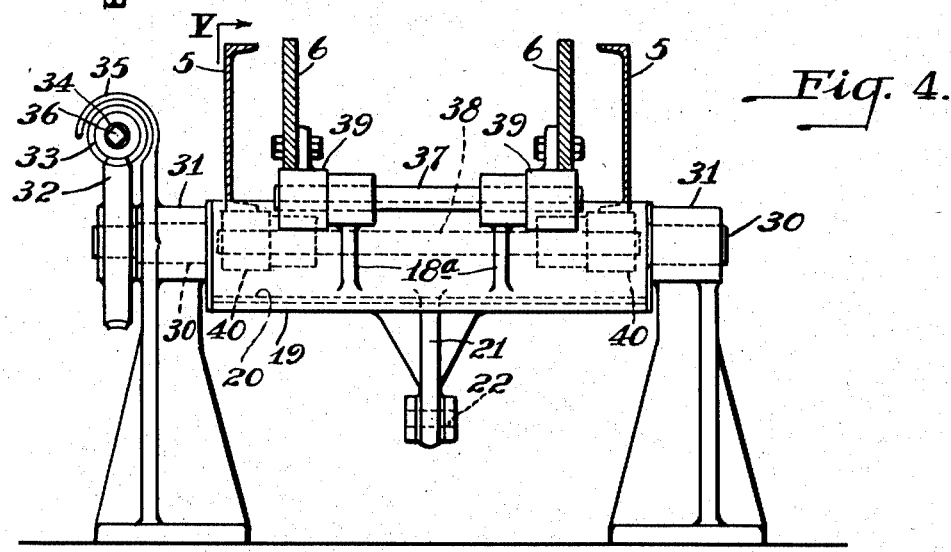
Fig. 4 is a cross section on the line IV—IV of Fig. 3.

The table as a whole comprises a series of stationary trough-shaped apron supports 2, and a corresponding series of alternating supporting rollers 3, mounted for vertical movement between the aprons for elevation of the unit thereabove and for lowering it thereon, as the aprons and rollers are alternately moved upwardly and downwardly.

The table is located in alinement with the pass between the cross rolls A, A, of well known construction, the upper of which is adjustable for varying sizes. The construction and operation of the cross rolls is well understood by those skilled in the art, and need not be further described.

The aprons 2 are generally concaved or V-shaped longitudinally, arranged in a row leading to the pass of the cross rolls, and are mounted by their spaced apart bases 4 on the longitudinal raising and lowering structural framework, as channels 5—5. Intervening between said channels are the main framing supports for the feeding rollers, in the form of longitudinal bars 6—6 of any suitable construction, and capable of being bodily elevated and lowered with the cross rolls and their driving mechanism, as hereinafter described.

The outermost rollers $3^a$ are idler rollers, mounted in brackets 7 extending upwardly from the end portions of frame 6, while the intervening rollers 3 are positively driven. For such purpose, they are each provided with a cross shaft 8 mounted in similar bearing brackets 7 and having a bevel wheel 9 engaging a driving bevel 10 of shaft 11, the bevels being surrounded by a suitable covering and enclosing box 12, as shown. Shaft 11 is supported at intervals in bracket bearings 13 extending from frame 6, as in Figs. 1 and 2. Shaft 11 is flexibly connected by a universal jointed link 14 to the drive shaft 15 of a gear box 16, operatively connected with motor 17 for continuous rotation of all of the feed rolls.

For the purpose of raising and lowering the entire feed roller frame and its rollers simultaneously with co-operating lowering and raising of the apron frame, I provide pairs of walking beam levers $18^a$, $18^b$, pivotally mounted by their middle hubs at 19 around an adjustable eccentric 20, for adjusting the fulcrums of the levers upwardly or downwardly. As shown, such an adjustable fulcrum is arranged transversely of the machine, near its outer ends, with its terminal shafts 30 mounted in the supporting bearings 31. The lower operating arm 21 of each lever $18^a$—$18^b$ is connected at 22 with the connecting rods 23 and 29 of any suitable construction, by which the pair of levers $18^a$—$18^b$ are simultaneously actuated from the middle portion of the machine.

Such actuation is effected by the movement of any suitable prime mover, as a solenoid magnet 24 mounted in its armature 25, which is fixedly carried in the main framework of the table, as shown. Magnet 24 is connected by terminal and link 26 with one end of bell crank lever 27, pivoted at $c$ in a rigid bearing. The other arm $27^a$ of the lever is connected at 28 with connecting rods 23 and 29 respectively, leading oppositely to the downwardly extending arm 21 of each walking beam lever.

By such construction, it will be seen that, as the magnet is energized, the entire roller supporting table may be raised or lowered to the desired distance by the operator, with simultaneous lowering and raising of the apron supporting table, and in conformity with the desired condition of the table with relation to the pipe or other unit being delivered to the cross rolls. Thus, with the feed rollers 3 elevated, as in Fig. 7, and with their work supporting surfaces slightly above the work supporting portions of the aprons 2, and with power transmitted from the motor 17, the unit will be fed forwardly until it enters between the cross rolls. Thereupon, the entire roller table is lowered, releasing the feed rollers from underneath the unit, which then rests upon the upwardly lifted aprons, as in Fig. 8.

In this manner, the unit is moved the desired or necessary distance for introduction to the cross rolls with the feed rollers elevated. The feed rollers are then immediately lowered away from any dangerous proximity, avoiding injury from the free and more or less irregular movement of the unit as it advances through the cross rolls.

In order to raise or lower the entire working level of the tables together, to adapt them to adjustment of the center of the article being rolled to the center of the cross roll pass, means are provided for raising and lowering the entire supporting bearings of the actuating walking beam levers together.

The adjustment of such bearings is accurately provided for by the pair of rotatable eccentrics 20. These are mounted by their eccentrically off-set terminal shafts 30 which extend beyond the middle main lever bearing portion and are mounted in the outer bearings 31, by which the eccentric shaft is carried.

At its outer end one of the shaft extensions 30 is provided with the worm wheel 32 in gear engagement with a driving worm 33 of shaft 34. Shaft 34 extends along the outside of the main supporting and vertically adjustable framework in bearing extensions 35 of bearings 31 and is provided with squared terminals 36 by which the shaft may be actuated from either end by use of a suitable wrench. By such means, the eccentric bearings for the walking beam levers may be very accurately adjusted so as to provide for the proper raising and lowering limits of the table and the feeding rollers, with relation to the center of the cross rolls.

Figure 5:
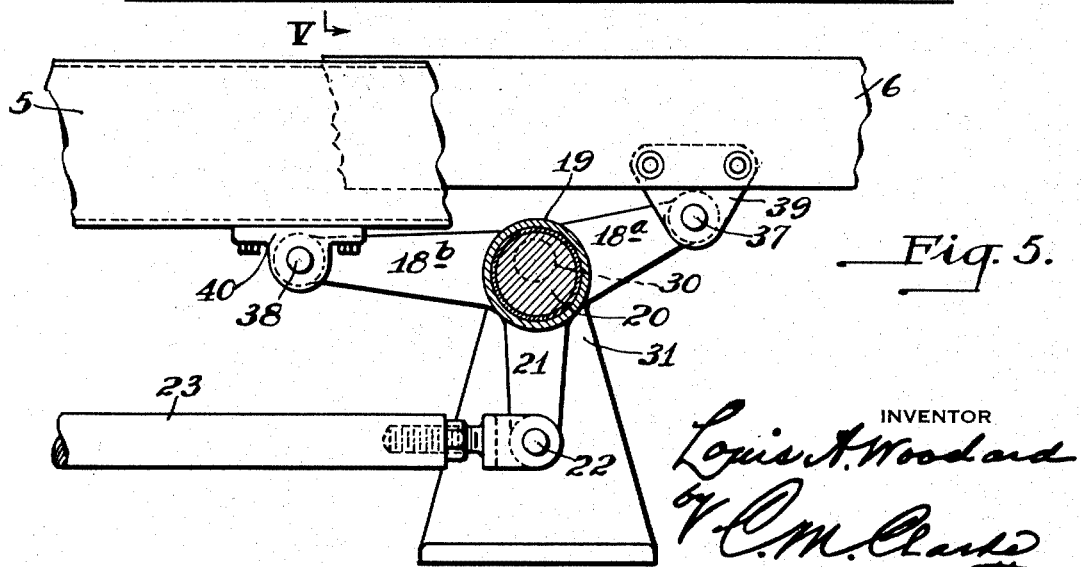
Fig. 5 is a longitudinal sectional detail view on the line V—V of Fig. 4, partly broken away.

The walking beam levers 18ª—18ᵇ with their middle pivoting barrel 19 are freely journalled around the supporting eccentric bearing 20 for easy movement thereon, with an intervening bearing ring if desired, as in Fig. 5.

The walking beam levers are preferably made of an integral casting for rigidity, and their arms 18ª and 18ᵇ are pivotally connected with the table members 6 and 5 respectively by cross shafts 37 and 38 engaging brackets 39 and 40 rigidly connected with the beam table members 6 and 5.

For convenience in providing for transmission of power from the middle prime mover through lever 27—27ª by tension, one of the table structures, as the roller table, may be somewhat heavier than the other, so as to resume its lowered position by gravity.

In Figs. 9 to 11 inclusive I show a modified construction of raising and lowering means for the walking beam lever, utilizing screw mechanism in place of the eccentric adjustment.

In such case the transverse pivotal supporting bearing 20ª for the lever hub 19 is mounted by extensions 41 and nuts 42 of extension studs on the upper ends 43 of adjusting screws 44.

These are threaded into supporting bases 45 and are provided with upper necks 46 for the rotating worm wheels 32ª, splined on the necks for rotation of the screws. The bearing shaft is supported in this manner at each end, and the worm wheels 32ª are operated together to raise or lower by a pair of worms 33ª mounted on actuating shaft 34ª in bearings 35ª of the base.

By such means the entire normal level of the whole series of aprons, and the slightly lower series of feed rollers (when lowered) may be vertically adjusted to adapt the operation to varying diameters of pipe, etc., as in the eccentric bearings above described.

The construction and operation of the invention will be readily understood and appreciated from the foregoing description. It will be understood also that after the tables are adjusted for any given size of pipe, the slight alternating change of level of the feed rollers and aprons is accomplished by but limited movement of the levers, while each set of supports, i. e. rollers and tables is alone active at one time.

The general arrangement, number, size and various detail features of the mechanism may be changed or varied by the skilled mechanic to adapt it to conditions of installation or for other reasons, but all such changes are to be understood as within the scope of the following claims.

What I claim is:

1. A conveyer table for a cross roll straightening machine, consisting of a series of supporting members in alinement with the pass of the rolls, a series of alternating feeding rollers, and means for alternately varying the height of the supporting members and feeding rollers.

2. A conveyer table for a cross roll straightening machine, consisting of a series of supporting members in alinement with the pass of the rolls, a series of alternating feeding rollers having means for rotating them, and means for elevating and lowering the feeding rollers with relation to the supporting members.

3. A conveyer table for a cross roll straightening machine, consisting of a series of supporting members in alinement with the pass of the rolls, a series of alternating feeding rollers having means for rotating them, means for elevating and lowering the feeding rollers with relation to the supporting members, and independent means for raising and lowering the normal level of the supporting members together.

4. In a feed table of the kind described, a supporting frame having a series of supporting aprons, a supporting frame having a series of feeding rollers, means for alternately raising and lowering each frame, and means for driving the rollers together.

5. In a feed table of the kind described, a supporting frame having a series of supporting aprons, a supporting frame having a series of feeding rollers, levers connected with each of said frames for simultaneously raising one frame and lowering the other, and vertically adjustable fulcrum supports for said levers.

6. In a feed table of the kind described, a supporting frame having a series of supporting aprons, a supporting frame having a series of feeding rollers, levers connected with each of said frames for simultaneously raising one frame and lowering the other, vertically adjustable fulcrum supports for said levers, and means for adjusting said supports together.

7. In a feed table of the kind described, a supporting frame having a series of supporting aprons, a supporting frame having a series of feeding rollers, levers connected with each of said frames for simultaneously raising one frame and lowering the other, vertically adjustable fulcrum supports for said levers, and means for actuating said levers together.

8. In a feed table for a cross roll straightening machine, a longitudinally arranged series of supporting aprons, a similar series of feeding rollers alternating with the aprons, a supporting frame for the aprons, a supporting frame for the rollers, lever mechanism for raising and lowering each frame in alternate directions, and a vertically adjustable fulcrum for the lever mechanism.

9. In a feed table for a cross roll straightening machine, a longitudinally arranged series of supporting aprons, a similar series of feeding rollers alternating with the aprons, a supporting frame for the aprons, a supporting frame for the rollers, lever mechanism for raising and lowering each frame in alternate directions, and a vertically adjustable transverse fulcrum shaft for said lever having gearing for raising and lowering it.

10. In a feed table for a cross roll straightening machine, a longitudinally arranged series of supporting aprons, a similar series of feeding rollers alternating with the aprons, a supporting frame for the aprons, a supporting frame for the rollers, lever mechanism for raising and lowering the opposite end portions of each frame together in alternate directions, a transverse fulcrum shaft for each of said lever mechanisms, and connected means for vertically adjusting the fulcrum shafts together.

11. The combination with alternately movable frames carrying series of alternating supporting aprons and feed rollers respectively, of a pair of walking beam levers connected with each of said frames at their end portions each having a downwardly extending lever, and an intervening power imparting element connected with said levers.

12. The combination with alternately movable frames carrying series of alternating supporting aprons and feed rollers respectively, of a pair of walking beam levers connected with each of said frames at their end portions each having a downwardly extending lever, an intervening power imparting element connected with said levers, and vertically adjustable fulcrums for said levers.

13. In a conveyer for cylindrical material for travel to or from a cross roll machine, a longitudinal series of rollers for conveying a unit in alinement with the pass of the cross rolls, a series of vertically movable supporting guides for the unit alternating with the rollers, and means for raising the rollers to feeding and supporting position and for lowering them below the guides.

14. The combination with a cross roll machine, of a series of supporting members and feeding rollers each capable of maintaining a pipe in axial alinement with the working pass of the machine, and means for alternately locating the supporting members and feeding rollers respectively.

15. The combination with a cross roll machine, of a series of supporting members and feeding rollers each capable of maintaining a pipe in axial alinement with the working pass of the machine, and means for elevating the supporting members to supporting position with respect to the cross roll machine and lowering the feeding rollers and simultaneously reversing their positions.

16. The combination with a cross roll machine, of a series of supporting members and feeding rollers each capable of maintaining a pipe in axial alinement with the working pass of the machine, means for driving the feeding rollers, and means for elevating the feeding rollers to supporting and feeding position with respect to the cross roll machine and lowering the supporting members and simultaneously reversing their position.

17. The combination with a cross roll machine, of a series of supporting members and feeding rollers each capable of maintaining a pipe in axial alinement with the working pass of the machine, means for elevating the feeding rollers to supporting and feeding position with respect to the cross roll machine and lowering the supporting members and simultaneously reversing their position, and means for driving the feeding rollers.

18. In an apparatus for conveying round material to or from a cross roll machine, a series of propelling feeding rollers adapted to convey a unit with its axis coincident with the axis of its path through the cross roll machine, and a series of guiding supports for the unit adapted to be substituted for the feeding rollers when the unit is rotating in the cross roll machine and providing supports therefor.

In testimony whereof I hereunto affix my signature.

LOUIS A. WOODARD.